United States Patent
Shiraishi et al.

(10) Patent No.: US 10,484,432 B2
(45) Date of Patent: *Nov. 19, 2019

(54) SECURITY INFORMATION UPDATE SYSTEM, INFORMATION PROCESSING DEVICE, SECURITY INFORMATION UPDATE METHOD, AND SECURITY INFORMATION UPDATE PROGRAM

(71) Applicant: KONICA MINOLTA, INC., Chiyoda-ku, Tokyo (JP)

(72) Inventors: Jun Shiraishi, Toyokawa (JP); Toshiya Shozaki, Osaka (JP); Ryosuke Nishimura, Toyokawa (JP); Tomoko Maruyama, Toyokawa (JP); Shoko Haba, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 15/284,944

(22) Filed: Oct. 4, 2016

(65) Prior Publication Data

US 2017/0111398 A1 Apr. 20, 2017

(30) Foreign Application Priority Data

Oct. 15, 2015 (JP) .................. 2015-203776

(51) Int. Cl.
*H04L 29/06* (2006.01)
(52) U.S. Cl.
CPC ............ *H04L 63/205* (2013.01); *H04L 63/08* (2013.01); *H04L 63/083* (2013.01)
(58) Field of Classification Search
CPC ..... H04L 63/205; H04L 63/08; H04L 63/083; H04L 29/06; G06F 15/17
See application file for complete search history.

(56) References Cited

U.S. PATENT DOCUMENTS 9,430,637 B2 * 8/2016 Suzuki .................. G06F 21/608
9,723,024 B2 * 8/2017 Hagiuda .................. H04L 63/20
(Continued)

FOREIGN PATENT DOCUMENTS

| JP | 2004326763 A | 11/2004 | |
| JP | 2012252624 A | 12/2012 | |
| JP | 2012252624 A * | 12/2012 | ............... H04L 9/32 |

OTHER PUBLICATIONS

U.S. Appl. No. 15/290,174; Title: Security Information Update System, Information Processing Apparatus, Security Information Update Method and Non-Transitory Computer-Readable Recording Medium Encoded With Security Information Update Program ; First Named Inventor: Hiroyuki Ohno; Date Filed: Oct. 11, 2016.

*Primary Examiner* — Wasika Nipa
(74) *Attorney, Agent, or Firm* — Holtz, Holtz & Volek PC

(57) ABSTRACT

A security information update system includes a service providing server and information processing devices, the service providing server including: an authentication information memory that stores a pair of security information and identification information; and a service providing unit that provides a service to the information processing device, and the information processing devices including: a policy acquisition unit that acquires a security policy; a security information memory that stores security information; a process executing unit that transmits a pair of the same identification information and security information to the service providing server and receives a service; an authentication information acquisition unit that acquires security information after update; an update unit that updates security information with the acquired security information after the update date and time; and a prohibition unit that prohibits execution of a process of receiving a service after the update date and time until update with the security information.

12 Claims, 13 Drawing Sheets

(56) References Cited

U.S. PATENT DOCUMENTS

2006/0271789 A1 11/2006 Satomura et al.
2010/0064341 A1 3/2010 Aldera
2010/0242082 A1 9/2010 Keene et al.
2015/0169879 A1 6/2015 Hagiuda et al.
2017/0118248 A1 4/2017 Ohno et al.

* cited by examiner

FIG. 5

| TYPE | UPDATE DATE AND TIME | GROUP DEVICE |
|---|---|---|
| mail-account-A | 00:00 ON THE FIRST DAY EVERY MONTH | MFP-0, MFP-1, MFP-2, MFP-3, MFP-5 |
| DB-account-B | 00:00 ON THE TENTH DAY EVERY MONTH | MFP-0, MFP-1, MFP-2, MFP-3, MFP-5 |

SECURITY INFORMATION UPDATE SYSTEM, INFORMATION PROCESSING DEVICE, SECURITY INFORMATION UPDATE METHOD, AND SECURITY INFORMATION UPDATE PROGRAM

The entire disclosure of Japanese Patent Application No. 2015-203776 filed on Oct. 15, 2015 including description, claims, drawings, and abstract are incorporated herein by reference in its entirety.

BACKGROUND OF THE INVENTION

Field of the Invention

The present invention relates to a security information update system, an information processing device, a security information update method, and a security information update program, and relates to a security information update system for updating security information stored in each of several information processing devices, such an information processing device, a security information update method and a security information update program carried out by the security information update system and the information processing device.

Description of the Related Art

An image processing device typified by a multi-function printer (hereinafter referred to as "MFP") sometimes communicates with an external device and carries out a process in cooperation with that external device. In this case, a password that is determined in two or more devices in advance is used in order to confirm a counterpart device to be communicated with. In addition, since this password requires secrecy, it is preferable that the password be managed by an administrator who manages an image forming device and be changed regularly or irregularly. However, when the password is to be changed, the password needs to be changed in all of the several image forming devices that store the password.

As a technology to change a password, JP2012-252624 A discloses an information processing device for controlling use of a device by a user on the basis of user information connected to an administrative server that manages a device user on the basis of user information which includes an acceptance unit that accepts a request of user authentication, a determination unit that determines whether or not the effective period of internal user information of the user who has requested authentication that is held in the device is expired when user request is accepted, an acquisition unit that acquires external user information of the user who has requested authentication from the administrative server if it is determined that the effective period is expired, an update unit that updates internal user information on the basis of the acquired external user information, and a control unit that controls whether or not to permit the user who has requested authentication to use the device on the basis of the updated internal user information.

However, in JP 2012-252624 A, a user who uses an information processing device needs to use both user information before update and user information after update depending on before/after of expiration of the effective period. When the user makes a mistake in using correct user information, more specifically, when the user information after update is used before the effective period is expired, or the user information before update is used after the effective period is expired, an event that the use of a device is not permitted by the information processing device (authentication failure) occurs due to mismatch of the user information.

In addition, when an event that the user makes a mistake in using the user information and the use of a device is not permitted occurs several consecutive times, there is a problem that the user information is locked and a device cannot be used until the user information is unlocked.

SUMMARY OF THE INVENTION

The present invention has been developed to solve the problems descried above, and an object of the present invention is to provide a security information update system for preventing occurrence of an event of authentication failure in a service providing server.

Another object of the present invention is to provide an information processing device for preventing occurrence of an event of authentication failure in a service providing server.

Still another object of the present invention is to provide a security information update method for preventing occurrence of an event of authentication failure in a service providing server.

Still another object of the present invention is to provide a security information update program for preventing occurrence of an event of authentication failure in a service providing server.

To achieve at least one of the abovementioned objects, according to an aspect, a security information update system reflecting one aspect of the present invention comprises a service providing server and several information processing devices, wherein the service providing server comprises: an authentication information memory that stores a pair of security information updated at an update date and time and identification information for identifying a type of the security information; and a service providing unit that provides a service to the information processing device on the condition that the same pair as the pair of identification information and security information received from any of the several information processing devices is stored in the authentication information memory, and each of the several information processing devices comprises: a policy acquisition unit that acquires a security policy that determines the identification information stored in the service providing server and an update date and time; a security information memory that stores security information in association with the same identification information as the identification information stored in the service providing server; a process executing unit that transmits a pair of the same identification information as the identification information stored in the service providing server and security information stored in association with the identification information to the service providing server and receives a service by the service providing server when a process of receiving a service provided by the service providing server is executed; an authentication information acquisition unit that acquires security information after update in the service providing server for the identification information stored in the service providing server; an update unit that updates security information stored in the security information memory in association with the identification information stored in the service providing server with the acquired security information after the update date and time determined by the security policy for the identification information stored in the service providing server; and a prohibition unit that prohibits execution of a process of receiving a service by the service providing server by the process executing unit after the update date and time determined by the security policy for the identification information stored in the service providing server until update with the acquired security information by the update unit.

According to an aspect of the present invention, since each of several information processing devices prohibits execution of a process of receiving a service by a service providing server until security information stored in association with identification information stored in the service providing server is updated by acquired security information after the update date and time determined by a security policy for identification information stored in the service providing server, it is possible to provide a security information update system for preventing occurrence of an event of authentication failure in the service providing server.

The process executing unit preferably executes the process prohibited by the prohibition unit in accordance with update of the security information stored in the security information memory by the update unit after the update date and time has passed.

According to an aspect of the present invention, since the process prohibited after the update date and time has passed is carried out after security information is updated, an operation for carrying out the prohibited process again is not required.

Each of the several information processing devices preferably further comprises a notification unit that notifies a user that the security information has not been updated while execution of a process of receiving a service by the service providing server by the process executing unit is being prohibited by the prohibition unit.

According to an aspect of the present invention, since a user is notified that security information is not updated while execution of the process of receiving a service by a service providing server is prohibited, it is possible to notify the user of the reason that the process of receiving a service is not executed.

Each of the several information processing devices preferably further comprises a communication state detection unit that detects a communication state with the service providing server, and the notification unit preferably notifies that it is not possible to communicate with the service providing server if discommunication with the service providing server is detected by the communication state detection unit while execution of a process of receiving a service by the service providing server by the process executing unit is being prohibited by the prohibition unit.

According to an aspect of the present invention, it is possible to notify the user that the reason that the process of receiving a service is not executed is communication failure.

The security information update system preferably further comprises an administrative server that manages security information stored in the service providing server, the administrative server preferably comprises a policy memory that stores the security policy, and the policy acquisition unit preferably acquires a security policy stored in the administrative server from the administrative server.

According to an aspect of the present invention, since each information processing device acquires a security policy stored in an administrative server, it is only required to control the update date and time of security information in the administrative server and management of security information becomes easier.

The administrative server preferably further comprises an update instruction transmission unit that transmits an update instruction including the identification information and new security information after update in the service providing server to each of the several information processing devices at the time and date determined on the basis of the update date and time determined by the security policy for the identification information stored in the service providing server, and the authentication information acquisition unit preferably acquires the new security information included in the update instruction as security information after update in the service providing server storing the identification information included in the update instruction in accordance with reception of the update instruction from the administrative server.

According to an aspect of the present invention, since each of several information processing devices updates security information specified by a type of identification information included in an update instruction with new security information included in the update instruction in response to receiving the update instruction from an administrative server, it is possible to minimize gap of the timing to update security information in each of the several information processing devices.

The authentication information acquisition unit preferably acquires security information after update in the service providing server for the identification information stored in the service providing server after the date and time determined on the basis of the update date and time determined by the security policy for the identification information stored in the service providing server.

According to an aspect of the present invention, since security information that is updated after the date and time determined with the reference being the update date and time, when security information after update after the update date and time is to be acquired, security information can be updated immediately after the acquisition, and when security information after update updated before the update date and time is to be acquired, security information can be updated at the update date and time.

The administrative server preferably stores new security information after update in the service providing server for the identification information stored in the service providing server, and the authentication information acquisition unit preferably acquires security information after update in the service providing server for the identification information stored in the service providing server from the administrative server.

According to an aspect of the present invention, since security information after update is acquired from an administrative server, acquisition of security information after update is easy.

Each of the several information processing devices preferably further comprises an operation acceptance unit that accepts an operation by a user, and the authentication information acquisition unit preferably acquires new security information accepted by the operation acceptance unit as security information after update in the service providing server for the identification information stored in the service providing server.

According to an aspect of the present invention, since security information input by the user is acquired as security information after update, it is possible to increase secrecy by not transmitting security information.

Each of the several information processing devices is preferably classified into any of one or more groups, and the identification information is preferably group identification information for identifying any of one or more groups.

According to an aspect of the present invention, security information can be updated for one or more groups.

To achieve at least one of the abovementioned objects, according to an aspect, an information processing device that can communicate with a service providing server for providing a service on the condition that the same pair as the pair of identification information and security information stored in advance is received, reflecting one aspect of the present invention comprises: a policy acquisition unit that acquires a security policy determining the identification information stored in the service providing server and an update date and time; a security information memory that stores security information in association with the same identification information as the identification information stored in the service providing server; a process executing unit that transmits a pair of the same identification information as the identification information stored in the service providing server and security information stored in association with the identification information to the service providing server and receives a service by the service providing server when a process of receiving a service provided by the service providing server is executed; an authentication information acquisition unit that acquires security information after update in the service providing server for the identification information stored in the service providing server; an update unit that updates security information stored in the security information memory in association with the identification information stored in the service providing server with the acquired security information after the update date and time determined by the security policy for the identification information stored in the service providing server; and a prohibition unit that prohibits execution of a process of receiving a service by the service providing server by the process executing unit after the update date and time determined by the security policy for the identification information stored in the service providing server until update with the acquired security information by the update unit.

According to an aspect of the present invention, it is possible to provide an information processing device for preventing occurrence of an event of authentication failure in a service providing server.

To achieve at least one of the abovementioned objects, according to an aspect, a security policy update method reflecting one aspect of the present invention is executed in an information processing device that can communicate with a service providing server for providing a service on the condition that the same pair as the pair of identification information and security information stored in advance is received, wherein the information processing device comprises a security information memory that stores security information in association with the same identification information as the identification information stored in the service providing server, and the security policy update method comprises: acquiring a security policy determining the identification information stored in the service providing server and an update date and time; transmitting a pair of the same identification information as the identification information stored in the service providing server and security information stored in association with the identification information to the service providing server and receiving a service by the service providing server when a process of receiving a service provided by the service providing server is executed; acquiring security information after update in the service providing server for the identification information stored in the service providing server; updating security information stored in the security information memory in association with the identification information stored in the service providing server with the acquired security information after the update date and time determined by the security policy for the identification information stored in the service providing server; and prohibiting execution of a process of receiving a service by the service providing server in the updating security information after the update date and time determined by the security policy for the identification information stored in the service providing server until update with the acquired security information in the updating security information.

According to an aspect of the present invention, it is possible to provide a security information update method for preventing occurrence of an event of authentication failure in a service providing server.

To achieve at least one of the abovementioned objects, according to an aspect, a non-transitory recording medium storing a computer readable security information update program reflecting one aspect of the present invention is executed in a computer for controlling an information processing device that can communicate with a service providing server for providing a service on the condition that the same pair as the pair of identification information and security information stored in advance is received, wherein the information processing device comprises a security information memory that stores security information in association with the same identification information as the identification information stored in the service providing server, and the security policy update program causes the computer to: acquire a security policy determining the identification information stored in the service providing server and an update date and time; transmit a pair of the same identification information as the identification information stored in the service providing server and security information stored in association with the identification information to the service providing server and receive a service by the service providing server when a process of receiving a service provided by the service providing server is executed; acquire security information after update in the service providing server for the identification information stored in the service providing server; update security information stored in the security information memory in association with the identification information stored in the service providing server with the acquired security information after the update date and time determined by the security policy for the identification information stored in the service providing server; and prohibit execution of a process of receiving a service by the service providing server in the updating security information after the update date and time determined by the security policy for the identification information stored in the service providing server until update with the acquired security information in the updating security information.

According to an aspect of the present invention, it is possible to provide a security information update program for preventing occurrence of an event of authentication failure in a service providing server.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 illustrates an example of a policy table;

DESCRIPTION OF THE PREFERRED EMBODIMENTS

Figure 1:
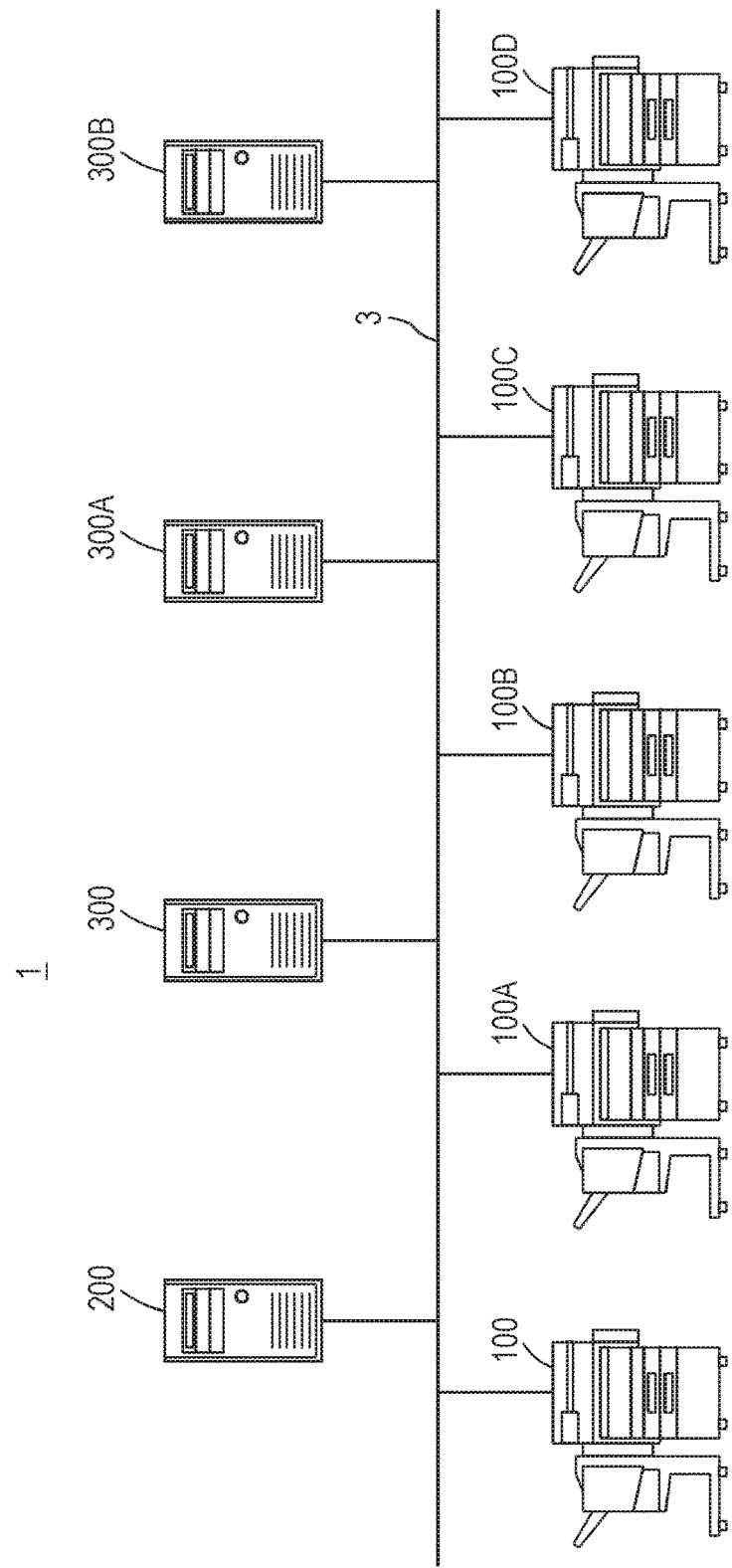
FIG. 1 illustrates an example of an overall outline of a security information update system according to the present embodiment.

Hereinafter, an embodiment of the present invention will be described with reference to the drawings. However, the scope of the invention is not limited to the illustrated examples. The same reference numeral is given to the same component in the following description. The name and the function of such a component are also the same. Therefore, detailed description will not be repeated for such a component.

FIG. 1 illustrates an example of an overall outline of a security information update system according to the present embodiment. With reference to FIG. 1, a security information update system 1 includes an administrative server 200, service providing servers 300 and 300A, and MFPs (Multi-Function Peripheral) 100 and 100A to 100D as multi-function printers. Each of the administrative server 200, the service providing servers 300 and 300A, and the MFPs 100 and 100A to 100D is connected to a network 3. The network 3 is local area network (LAN), for example. Therefore, the administrative server 200, the service providing servers 300 and 300A, and the MFPs 100 and 100A to 100D can communicate with one another. The MFPs 100 and 100A to 100D and the service providing servers 300 and 300A are examples of an information processing device. The hardware configuration and function of the MFPs 100 and 100A to 100D are the same. Therefore, description will be given with the MFP 100 as an example unless otherwise noted.

Note that, although the network 3 is LAN here, the network 3 is not limited to LAN and may be the Internet, wide area network (WAN), network using public switched telephone network, or the like.

Each of the service providing servers 300 and 300A is a computer for providing a predetermined service. Here, the service providing server 300 functions as an email server for providing a service of sending/receiving emails and the service providing server 300A functions as a database server (hereinafter referred to as "DB server") for providing database. Note that, a service provided by the service providing servers 300 and 300A is not limited to these services and may be other services.

Each of the service providing servers 300 and 300A provides a service on the condition that authentication of a device or a user accessing the service providing server 300 or 300A is successful to increase security. Specifically, each of the service providing servers 300 and 300A has a registered pair of identification information and security information in advance and provides a service to a device that has transmitted the registered pair of identification information and security information. The identification information stored in each of the service providing servers 300 and 300A is an account for identifying a device or a user accessing the service providing server 300 or 300A for example, and the security information stored in each of the service providing servers 300 and 300A is a password. Here, each of the MFPs 100 and 100A to 100D stores the pair of identification information and security information registered for each of the service providing servers 300 and 300A. In other words, the MFPs 100 and 100A to 100D stores the pair of identification information and security information registered in the service providing server 300 and the pair of identification information and security information registered in the service providing server 300A. Therefore, they are classified into the first group including the MFPs 100 and 100A to 100D corresponding to the service providing server 300 and the second group including the MFPs 100 and 100A to 100D corresponding to the service providing server 300A. The pair of identification information and security information registered in the service providing server 300 is stored in each of the MFPs 100 and 100A to 100D that are classified into the first group and the pair of identification information and security information registered in the service providing server 300A is stored in each of the MFPs 100 and 100A to 100D that are classified into the second group. The identification information corresponding to the first group and the identification information corresponding to the second group are different from each other. In other words, the identification information corresponding to the first group is group identification information for identifying the first group and the identification information corresponding to the second group is group identification information for identifying the second group.

For example, when the MFP 100 receives a service by the service providing server 300 belonging to the first group, the pair of identification information and security information registered in the service providing server 300 is transmitted to the service providing server 300. The service providing server 300 authenticates if the pair of identification information and security information received from the MFP 100 is registered and provides a service to the MFP 100 on the condition that authentication is successful. In addition, when the MFP 100 receives a service by the service providing server 300A belonging to the second group, the pair of identification information and security information registered in the service providing server 300A is transmitted to the service providing server 300A. The service providing server 300A authenticates if the pair of identification information and security information received from the MFP 100 is registered and provides a service to the MFP 100 on the condition that authentication is successful.

The first group and the second group may be divided into several groups. For example, the MFPs 100 and 100A to 100D belonging to the first group may be divided into the third group including the MFPs 100 and 100A and the fourth group including the MFPs 100B to 100D. Identification information in this case is different for the third group and the fourth group.

The administrative server 200 manages security information stored in each of the service providing servers 300 and 300A and the MFPs 100 and 100A to 100D. Specifically, the administrative server 200 defines a security policy that determines the date and time for update for types of security information. The security policy defines update date and time for types of security information. When a user operating the administrative server 200 inputs update date and time for types of security information in the administrative server 200, a policy table that defines update date and time for types of security information is stored in the administrative server 200.

Figure 2:
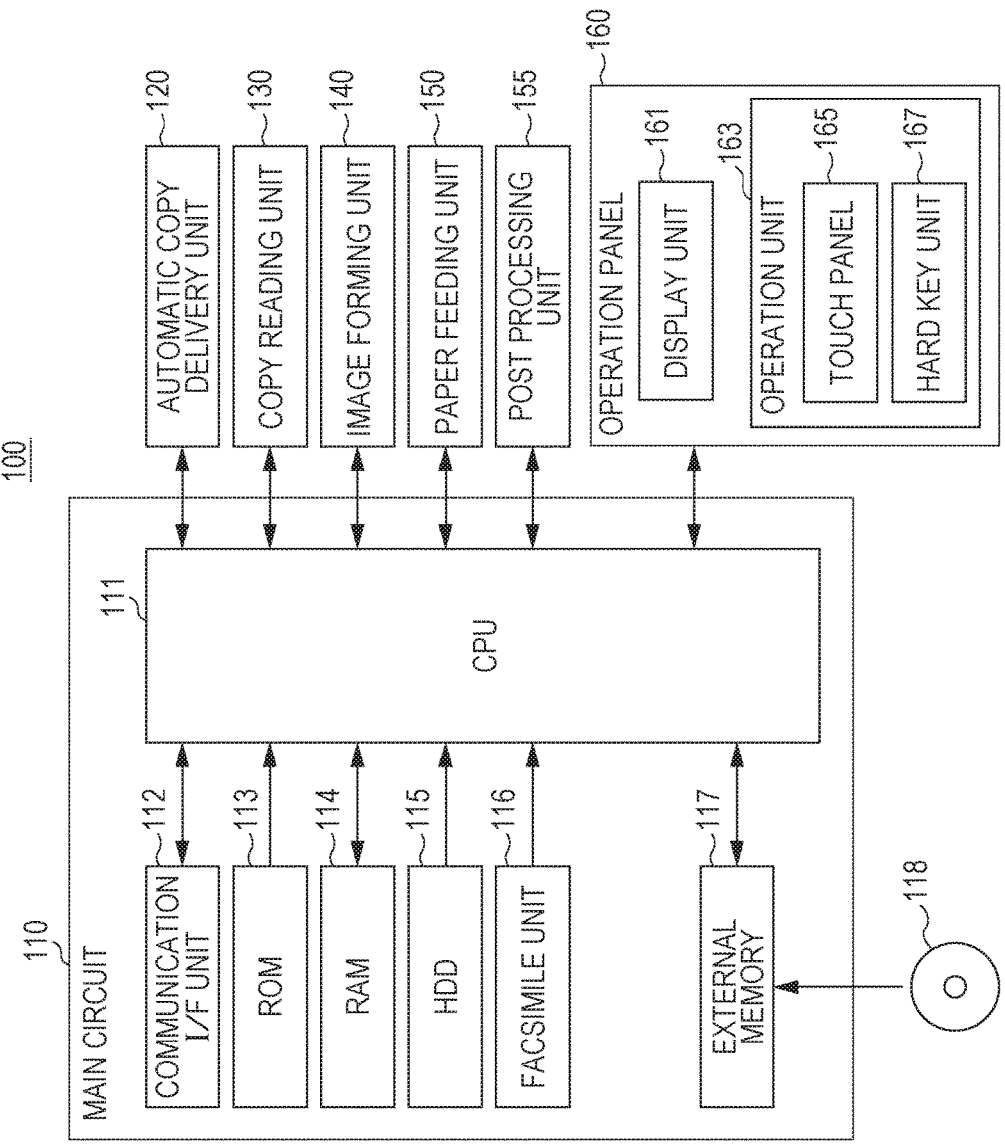
FIG. 2 is a block diagram illustrating an example of an outline of a hardware configuration of an MFP according to the present embodiment.

FIG. 2 is a block diagram illustrating an example of an outline of a hardware configuration of an MFP according to the present embodiment. With reference to FIG. 2, the MFP 100 includes a main circuit 110, a copy reading unit 130 that reads a copy, an automatic copy delivery unit 120 that delivers a copy to the copy reading unit 130, an image forming unit 140 that forms an image on paper or the like on the basis of image data output by the copy reading unit 130 by reading a copy, a paper feeding unit 150 that feeds paper to the image forming unit 140, a post processing unit 155 that processes paper on which an image is formed, and an operation panel 160 as a user interface.

The post processing unit 155 carries out a sort process of sorting and discharging one or more paper on which an image is formed by the image forming unit 140, a punch process of making punch holes, and a staple process of stapling.

The main circuit 110 includes a CPU (Central Processing Unit) 111, a communication interface (I/F) unit 112, a ROM (Read Only Memory) 113, a RAM (Random Access Memory) 114, a hard disc drive (HDD) 115 as a mass-storage device, a facsimile unit 116, and an external memory 117 to which a CD-ROM (Compact Disk ROM) 118 is mounted. The CPU 111 is connected to the automatic copy delivery unit 120, the copy reading unit 130, the image forming unit 140, the paper feeding unit 150, the post processing unit 155, and the operation panel 160 and controls the whole MFP 100.

The ROM 113 stores a program executed by the CPU 111 or data necessary to execute such a program. The RAM 114 is used as a work area when the CPU 111 executes a program. In addition, the RAM 114 temporarily stores read data (image data) continuously sent from the copy reading unit 130.

The operation panel 160 is provided on an upper face of the MFP 100 and includes a display unit 161 and an operation unit 163. The display unit 161 is a display device such as liquid crystal display (LCD) and organic ELD (Electro-Luminescence Display) and displays an instruction menu for a user and information or the like about the acquired image data. The operation unit 163 includes a hard key unit 167 including several keys and accepts input of data such as various instructions, letters, and numbers by operation by a user corresponding to the keys. The operation unit 163 further includes a touch panel 165 provided on the display unit 161.

The facsimile unit 116 is connected to public switched telephone network (PSTN) and transmits and receives facsimile data according to communication procedure of a facsimile.

The communication I/F unit 112 is an interface for connecting the MFP 100 to the network 3. Here, a case in which the communication I/F unit 112 transmits and receives data according to communication procedure of TCP (Transmission Control Protocol) is described. Note that, although TCP is described as an example of communication procedure here, communication procedure for transmitting and receiving data via the communication I/F unit 112 is not limited to TCP and may be UDP (User Datagram Protocol), for example. The CPU 111 communicates with a device connected to the network 3 via the communication I/F unit 112 and transmits and receives data. Moreover, when the network 3 is connected to the Internet, the communication I/F unit 112 can communicate with a computer connected to the Internet.

The HDD 115 has several memory areas. At least one of the several memory areas is shared and a password is set to that memory area. Each of the MFPs 100A to 100D, the administrative server 200, and the service providing servers 300 and 300A can access the shared memory area of the HDD 115 by transmitting the password set to the HDD 115 to the MFP 100.

The CD-ROM 118 is mounted to the external memory 117. The CPU 111 can access the CD-ROM 118 via the external memory 117. The CPU 111 load the program stored in the CD-ROM 118 mounted to the external memory 117 to the RAM 114 and executes that program. Note that, a medium for storing a program executed by the CPU 111 is not limited to the CD-ROM 118, and may be optical disc (MO (Magnetic Optical Disc)/MD (Mini Disc)/DVD (Digital Versatile Disc)), IC card, optical card, and semiconductor memory such as mask ROM, EPROM (Erasable Programmable ROM), and EEPROM (Electrically EPROM).

In addition, the CPU 111 may load the program stored in the HDD 115 to the RAM 114 to execute the program. In this case, another computer connected to the network 3 or the Internet may rewrite the program stored in the HDD 115 of the MFP 100 or additionally write a new program. Moreover, the MFP 100 may download a program from another computer connected to the network 3 or the Internet and store that program in the HDD 115. The program mentioned here includes a program that can be executed directly by the CPU 111 as well as a source program, a compressed program, an encrypted program, and the like.

Figure 3:
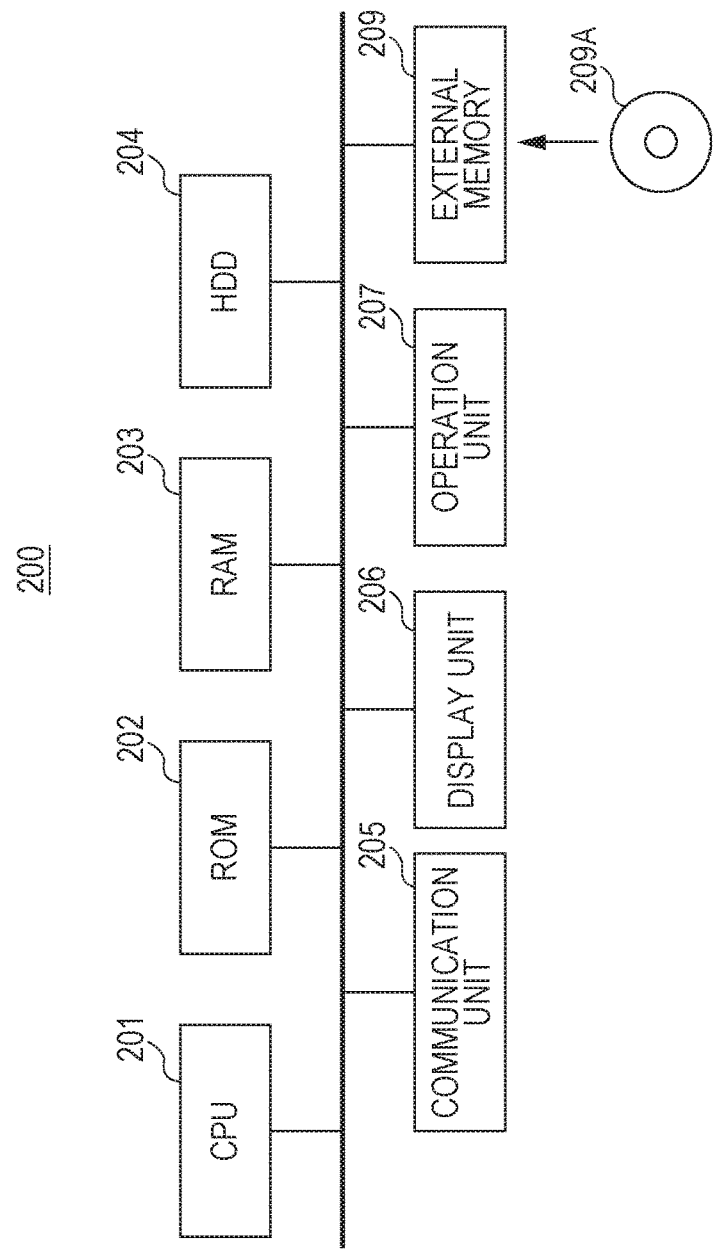
FIG. 3 is a block diagram illustrating an example of an outline of a hardware configuration of an administrative server according to the present embodiment.

FIG. 3 is a block diagram illustrating an example of an outline of a hardware configuration of an administrative server according to the present embodiment. With reference to FIG. 3, the administrative server 200 includes a CPU 201 for controlling the whole administrative server 200, a ROM 202 that stores a program to be executed by the CPU 201, a RAM 203 to be used as a work area of the CPU 201, an HDD 204 that stores data in a non-volatile manner, a communication unit 205 that connects the CPU 201 to the network 3, a display unit 206 that displays information, an operation unit 207 that accepts user operation, and an external memory 209.

A CD-ROM 209A is mounted to the external memory 209. The CPU 201 can access the CD-ROM 209A via the external memory 209. The CPU 201 loads the program stored in the CD-ROM 209A mounted to the external memory 209 to the RAM 203 and executes the program. Note that, a medium for storing the program executed by the CPU 201 is not limited to the CD-ROM 209A and may be optical disc, IC card, optical card, and semiconductor memory such as mask ROM, EPROM, and EEPROM.

In addition, the program executed by the CPU 201 is not limited to the program stored in the CD-ROM 209A and the program stored in the HDD 204 may be loaded to the RAM 203 to be executed. In this case, another computer connected to the network 3 may rewrite the program stored in the HDD 204 of the administrative server 200 or additionally write a new program. Moreover, the administrative server 200 may download a program from another computer connected to the network 3 or the Internet and store that program in the HDD 204. The program mentioned here includes a program that can be executed directly by the CPU 201 as well as a source program, a compressed program, an encrypted program, and the like.

Figure 4:
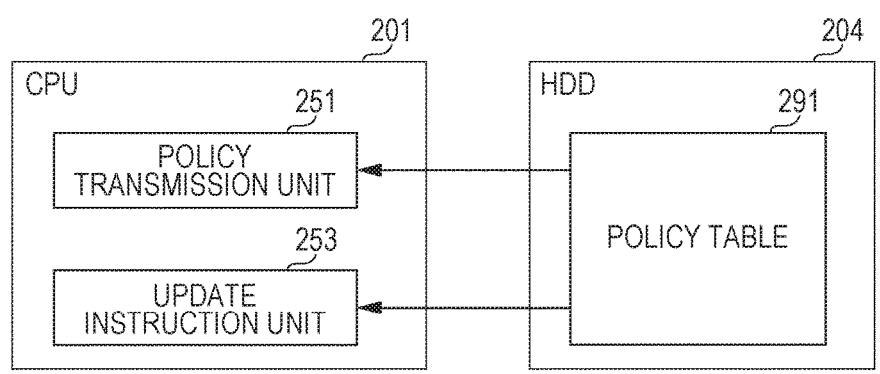
FIG. 4 is a block diagram illustrating an example of a function of a CPU included in the administrative server according to the present embodiment together with information stored in an HDD.

FIG. 4 is a block diagram illustrating an example of a function of a CPU included in the administrative server according to the present embodiment together with information stored in an HDD. The function illustrated in FIG. 4 is a function formed in the CPU 201 by executing the administrative program stored in the ROM 202, the HDD 204, or the CD-ROM 209A by the CPU 201 included in the administrative server 200. With reference to FIG. 5, the CPU 201 included in the administrative server 200 includes a policy transmission unit 251 and an update instruction unit 253. A policy table 291 is stored in the HDD 115.

FIG. 5 illustrates an example of a policy table. With reference to FIG. 5, the policy table includes two security records. The security records include item of type, item of update date and time, and item of group device. Identification information for identifying a type of security information is set to the item of type, date and time for updating the security information is set to the item of update date and time, and device identification information of a device storing the security information is set to the item of group device. For the security record of the first row, the identification information "mail-account-A" is set to the item of type, "00:00 on the first day every month" is set to the item of update date and time, and device identification information of each of the MFPs 100 and 100A to 100D is set to the item of group device. The identification information "mail-account-A" is an account registered in the service providing server 300, which is an email server. Here, the device identification information of the MFPs 100 and 100A to 100D is "MFP-1," "MFP-2," "MFP-3," "MFP-4," and "MFP-5."

For the security record of the second row, the identification information "DB-account-B" is set to the item of type, "00:00 on the tenth day every month" is set to the item of update date and time, and device identification information of each of the MFPs 100 and 100A to 100D is set to the item of group device. The identification information "DB-account-B" is an account registered in the service providing server 300A, which is a DB server.

Returning to FIG. 4, when a security policy is required from any of the MFPs 100 and 100A to 100D, the policy transmission unit 251 transmits the policy table 291 stored in the HDD 204 to the device that made the request.

The update instruction unit 253 transmits an update instruction to a device that stores security information for which predetermined date and time have passed with the reference being the update date and time. Specifically, the update instruction unit 253 refers to the policy table 291 and extracts a policy record for which the current time has passed the date and time determined on the basis of the update date and time. For example, the date and time determined on the basis of the update date and time is the date and time after the update time for a predetermined period. Since the security information is updated at the update date and time in each of the service providing servers 300 and 300A, the update instruction unit 253 acquires new security information after update from the service providing server 300 when the update date and time of the security information corresponding to the service providing server 300 has passed, and acquires new security information after update from the service providing server 300A when the update date and time of the security information corresponding to the service providing server 300A has passed. The update instruction unit 253 transmits an update instruction including the identification information set to the item of type of the extracted policy record and the new security information to all devices identified by the device identification information set to the item of group device.

For example, when the security record of the first row of the policy table 291 is extracted, the update instruction unit 253 transmits an update instruction including the pair of the identification information "mail-account-A" and the new security information acquired from the service providing server 300 to each of the MFPs 100 and 100A to 100D. In addition, when the security record of the second row of the policy table 291 is extracted, the update instruction unit 253 transmits an update instruction including the pair of the identification information "mail-account-A" and the new security information acquired from the service providing server 300A to each of the MFPs 100 and 100A to 100D.

Figure 6:
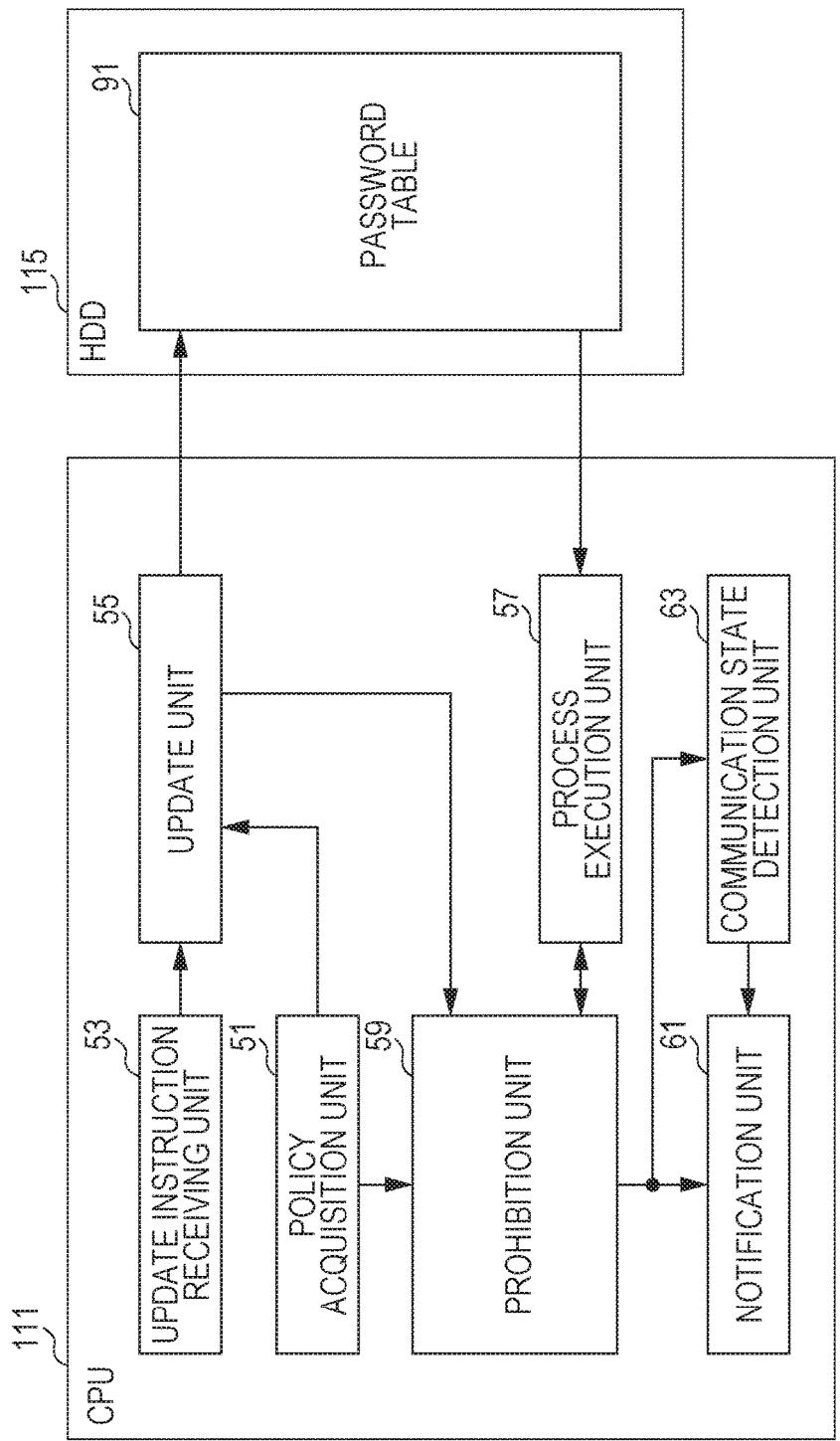
FIG. 6 is a block diagram illustrating an example of a function of a CPU included in the MFP according to the present embodiment together with information stored in an HDD.

FIG. 6 is a block diagram illustrating an example of a function of a CPU included in the MFP according to the present embodiment together with information stored in an HDD. The function illustrated in FIG. 6 is a function formed in the CPU 111 by executing a security information update program stored in the ROM 113, the HDD 115, or the CD-ROM 118 by the CPU 111 included in the MFP 100. With reference to FIG. 6, the CPU 111 included in the MFP 100 includes a policy acquisition unit 51, an update instruction receiving unit 53, an update unit 55, a process execution unit 57, a prohibition unit 59, a notification unit 61, and a communication state detection unit 63.

A password table 91 is stored in the HDD 115. The password table 91 includes a pair of identification information and security information. Specifically, the password table 91 includes a pair of identification information and security information registered in the service providing server 300 and a pair of identification information and security information registered in the service providing server 300A.

The policy acquisition unit 51 acquires a security policy from the administrative server 200. Network address of the administrative server 200 is stored in the HDD 115 and a security policy is requested to the administrative server 200. The policy acquisition unit 51 acquires the policy table 291 transmitted by the administrative server 200 in accordance with a request for a security policy. The policy acquisition unit 51 outputs the acquired policy table 291 to the update unit 55 and the prohibition unit 59. The policy acquisition unit 51 is only required to acquire the policy table 291 at a time determined in advance. The time determined in advance is not limited, but includes the time when the power of the MFP 100 is turned on and the time determined in advance every day, for example.

The update instruction receiving unit 53 controls the communication I/F unit 112 to receive an update instruction from the administrative server 200. The update instruction includes a pair of identification information of security information and new security information. The update instruction receiving unit 53 outputs the received update instruction to the update unit 55 in accordance with reception of the update instruction.

The policy table 291 is input to the update unit 55 from the policy acquisition unit 51 and the update instruction is input to the update unit 55 from the update instruction receiving unit 53. The update instruction includes a pair of identification information of security information and new security information. The update unit 55 updates the security information on the condition that the current date and time is after the update date and time for the security information. Specifically, the update unit 55 refers to the policy table 291 to extract a policy record in which the identification information included in the update instruction is set to the item of type in accordance with input of the update instruction. Then, if the current date and time is after the update date and time set to the item of update date and time of the extracted policy record, the update unit 55 updates security information of a type identified by the identification information included in the update instruction with the security information included in the update instruction. The update unit 55 identifies a pair including identification information that is the same as the identification information included in the update instruction from pairs of identification information and security information stored in the password table 91 stored in the HDD 115, and updates the security information of the identified pair with new security information included in the update instruction. According to update of the security information, the update unit 55 outputs history information including the date and time of update of the identification information of the security information to the prohibition unit 59.

The process execution unit 57 executes a process in accordance with an operation input to the operation unit 163 by a user. In addition, when the MFP 100 is remotely controlled by a personal computer or a mobile information device such as smartphone, the process execution unit 57 executes a process in accordance with remote control received from a personal computer or a mobile information device. A process executed by the process execution unit 57 includes a process executed by using security information included in the password table 91. A process executed by using security information includes a process of requesting execution of a process to the service providing server 300 for receiving a service by the service providing server 300 and a process of requesting execution of a process to the service providing server 300A for receiving a service by the service providing server 300A.

When execution of a process is requested to the service providing server 300, the process execution unit 57 refers to the password table 91 to acquire security information of identification information corresponding to the service providing server 300. Since the service providing server 300 is an email server, the account "mail-account-A" as identification information corresponding to the service providing server 300 and security information forming a pair with that account are acquired. The process execution unit 57 requests authentication to the service providing server 300 with the acquired account and security information, and requests transmission/reception of an email to the service providing server 300 when authentication by the service providing server 300 is successful.

An example of a process requested to the service providing server 300 includes a process of receiving emails stored in the service providing server 300 with a predetermined interval, a process of sending an email that notifies a predetermined address of an error when an error has occurred during execution of a job, and a process of sending an email that notifies a predetermined address that the number of transmission or reception of facsimile has reached the predetermined number when the number of transmission or reception of facsimile has reached the predetermined number.

In addition, when execution of a process is requested to the service providing server 300A, the process execution unit 57 refers to the password table 91 to acquire security information of identification information corresponding to the service providing server 300A. Since the service providing server 300A is a DB server, the service providing server 300A acquires a pair of the account "DB-account-B" and the password as the identification information corresponding to the service providing server 300A. The process execution unit 57 requests authentication to the service providing server 300A with the acquired account and password, and asks the service providing server 300A to execute a process to access the database when the authentication by the service providing server 300A is successful.

An example of a process requested to the service providing server 300A includes a process of registering log data indicating a result of a print process of forming an image or a scan process of reading a copy to the database and a process of registering log of the image on which a print process has been performed to the database.

The policy table 291 is input from the policy acquisition unit 51 to the prohibition unit 59 and the history information is input from the update unit 55 to the prohibition unit 59. When the process executed by the process execution unit 57 uses security information, the prohibition unit 59 prohibits execution of a process with security information by the process execution unit 57 since the update date and time of the security information has passed until update of the security information.

Specifically, the prohibition unit 59 acquires identification information indicating a type of security information used for a process with security information from the process execution unit 57 before the process is executed by the process execution unit 57. The prohibition unit 59 refers to the policy table 291 to identify the update date and time corresponding to the acquired identification information. Specifically, the prohibition unit 59 extracts a policy record in which the identification information acquired from the process execution unit 57 is set to the item of type and acquires the update date and time set to the item of update date and time of the extracted policy record. When the current date and time is after the update date and time and history information including the identification information acquired from the process execution unit 57 and the date and time after the update date and time is input from the update unit 55, the prohibition unit 59 determines that the security information of a type identified by the identification information has been updated. When the current date and time is after the update date and time and history information including the identification information acquired from the process execution unit 57 and the date and time after the update date and time is not input from the update unit 55, the prohibition unit 59 determines that the security information of a type identified by the identification information has been updated.

When it is determined that the security information of a type identified by the acquired identification information has not been updated at the time of acquiring the identification information from the process execution unit 57, the prohibition unit 59 prohibits execution of a process by the process execution unit 57. The prohibition unit 59 permits execution of a process by the process execution unit 57 in accordance with input of the history information including the acquired identification information and the date and time after the update date and time from the update unit 55 after execution of a process by the process execution unit 57 is prohibited. When it is determined that the security information of a type identified by the acquired identification information has been updated at the time of acquiring the identification information from the process execution unit 57, the prohibition unit 59 permits execution of a process by the process execution unit 57. During prohibition of execution of a process by the process execution unit 57, the prohibition unit 59 outputs a prohibition signal including identification information indicating a type of the security information used for the prohibited process to the notification unit 61 and the communication state detection unit 63.

When execution of a process is prohibited by the prohibition unit 59, the process execution unit 57 suspends that process and executes the suspended process in accordance with permission of execution of the process by the prohibition unit 59.

The communication state detection unit 63 controls the communication I/F unit 112 to detect a communication state of the network 3 while a prohibition signal is being input from the prohibition unit 59. Specifically, a device for registering security information of a type identified by the identification information included in the prohibition signal is identified and a communication state with the identified device is confirmed. For example, when the identification information included in the prohibition signal indicates a type of the security information registered in the service providing server 300, a PING command for the service providing server 300 is executed. It is determined that it is possible to communicate with the service providing server 300 when there is a response from the service providing server 300 and it is determined that it is not possible to communicate with the service providing server 300 when there is no response. The communication state detection unit 63 outputs the communication state of the service providing server 300 to the notification unit 61.

The notification unit 61 notifies the user that a process cannot be executed while a prohibition signal is being input from the prohibition unit 59. For example, an error message indicating that the security information is not updated and a process is suspended is displayed on the display unit 161. The notification unit 61 identifies a device for registering security information of a type identified by the identification information included in the prohibition signal to identify a process execution of which is prohibited. For example, when the identification information included in the prohibition signal indicates a type of the security information registered in the service providing server 300, the notification unit 61 identifies a process of transmitting/receiving emails as a process of receiving a service provided by the service providing server 300. When the communication state of the service providing server 300 input from the communication state detection unit 63 indicates that it is possible to communicate, the notification unit 61 displays a message indicating that the security information corresponding to the service providing server 300 is not updated and a process of transmitting/receiving the identified emails cannot be executed on the display unit 161.

In addition, when the process prohibited by the prohibition unit 59 identifies a process of transmitting/receiving emails and the communication state of the service providing server 300 input from the communication state detection unit 63 indicates that it is not possible to communicate, the notification unit 61 displays a message indicating that it is not possible to communicate with the service providing server 300 on the display unit 161. It is because a case in which it is not possible to communicate with the service providing server 300 includes a case in which an update instruction cannot be received from the administrative server 200 because of an error or the like of the network 3 and a case in which it is not possible to update security information by the update unit 55.

Figure 7:
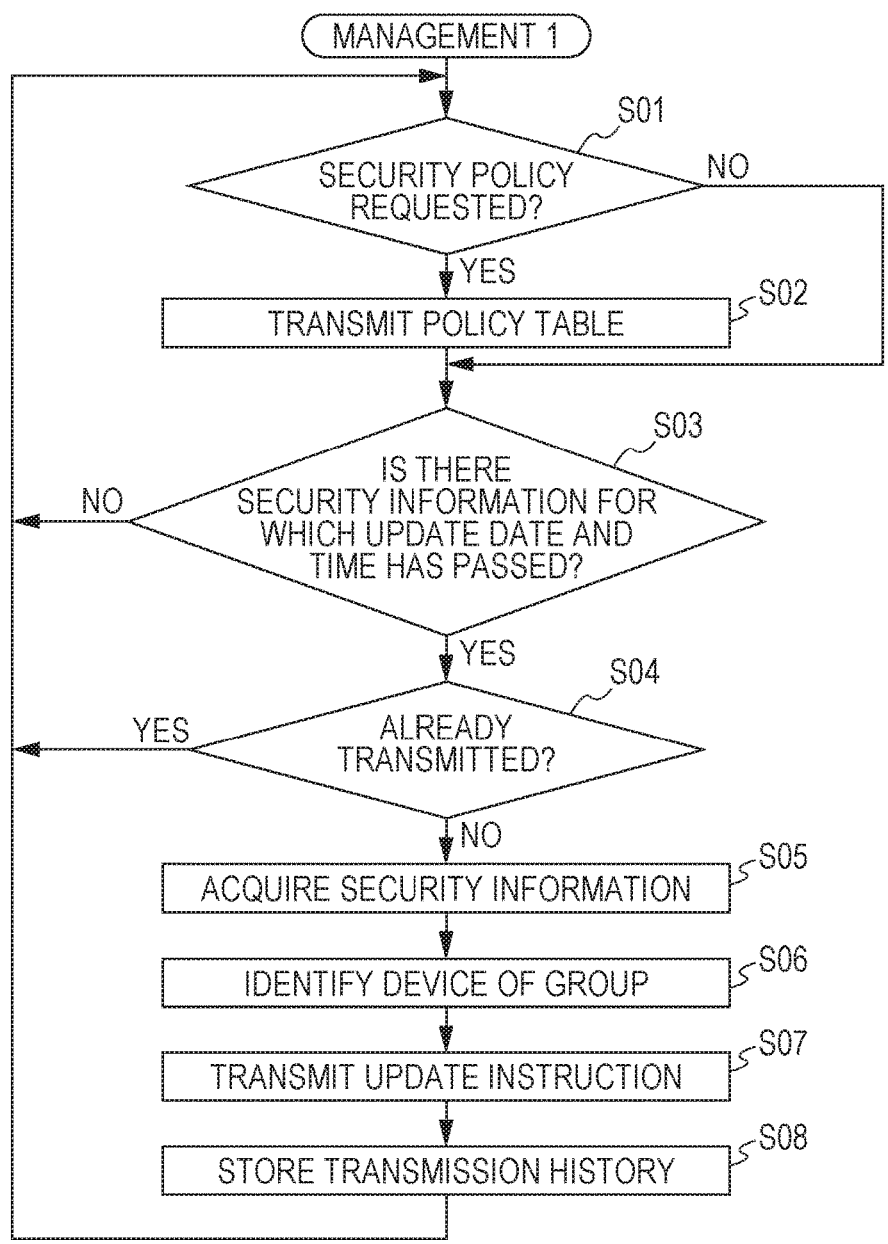
FIG. 7 is a flow chart showing an example of a flow of a management process.

FIG. 7 is a flow chart showing an example of a flow of a management process. The management process is a process executed by the CPU 201 by execution of an administrative program stored in the ROM 202, the HDD 204, or the CD-ROM 209A by the CPU 201 included in the administrative server 200. With reference to FIG. 7, the CPU 201 included in the administrative server 200 determines whether or not there has been a request for a security policy (step S01). The process proceeds to step S02 if a request for a security policy is received from any of the MFPs 100 and 100A to 100D that function as an information processing device, and the process proceeds to step S03 if not. In step S02, the policy table 291 stored in the HDD 204 is transmitted to the device that has requested a security policy out of the MFPs 100 and 100A to 100D, and the process proceeds to step S03.

In step S03, it is determined whether or not there is security information for which the update date and time has passed. Specifically, the CPU 201 refers to the policy table 291 stored in the HDD 204 to extract a policy record for which the current date and time has passed the update date and time. In the next step S04, it is determined whether or not an update instruction has already been transmitted. It is determined whether or not an update instruction has already been transmitted with the transmission history stored in step S08 described later. The transmission history is recorded when an update instruction is transmitted and includes the date and time the update instruction has been transmitted and identification information included in the update instruction. It is determined that an update instruction has already been transmitted if the update instruction and the transmission history including the same identification information correspond to each other and the date and time the update instruction included in the transmission history has been transmitted is after the update date and time. The process proceeds to step S05 if an update instruction has not been transmitted and the process goes back to step S01 if an update instruction has been transmitted.

In step S05, security information is acquired. Here, security information is acquired from a device in which security information of a type identified by the identification information set to the item of type of the policy record is registered. For example, if a device in which security information of a type identified by the identification information set to the item of type of the policy record is registered is the service providing server 300, new security information after update is acquired from the service providing server 300, and if a device is the service providing server 300A, new security information after update is acquired from the service providing server 300A.

In the next step S06, a device of the group is identified. Several devices each identified by several device identification information set to the item of group device of the policy record extracted in step S03 are identified as devices belonging to the group. Then, an update instruction is transmitted to each of the devices belonging to the group (step S07). An update instruction includes identification information set to the item of type of the policy record extracted in step S01 and the security information acquired in step S05.

In the next step S08, transmission history is stored and the process goes back to step S01. Transmission history includes identification information set to the item of type of the policy record extracted in step S01 and the date and time when the update instruction has been transmitted. The transmission history is used for determining in step S04 whether or not the update instruction has already been transmitted, and it is determined that the update instruction has already been transmitted if the date and time the update instruction included in the transmission history has been transmitted is after the update date and time.

Figure 8:
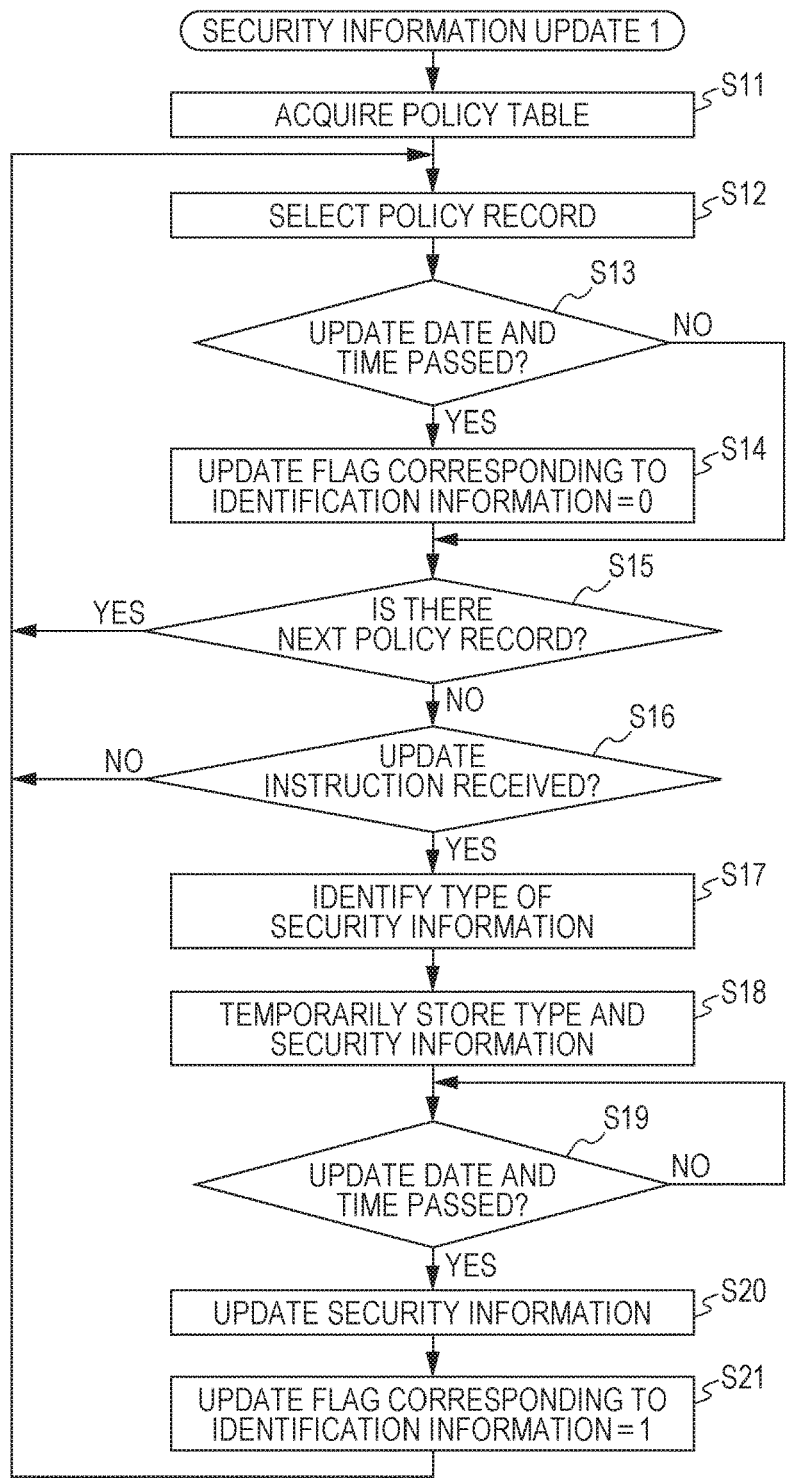
FIG. 8 is a flow chart showing an example of a flow of a security information update process.

FIG. 8 is a flow chart showing an example of a flow of a security information update process. The security information update process is a process executed by the CPU 111 by execution of a security information update program stored in the ROM 113, the HDD 115, or the CD-ROM 118 by the CPU 111 included in each of the MFPs 100 and 100A to 100D. With reference to FIG. 8, the CPU 111 included in the MFP 100 acquires a policy table from the administrative server 200 (step S11). Specifically, a security policy is requested to the administrative server 200 and the policy table 291 transmitted by the administrative server 200 in response to the request for the security policy is received.

In the next step S12, a policy record to be processed is selected from one or more policy records included in the policy table 291 and the process proceeds to step S13. In step S13, it is determined whether or not the update date and time has passed. If the current date and time is after the update date and time set to the item of update date and time of the selected policy record, it is determined that the update date and time has passed. The process proceeds to step S14 if the update date and time has passed, and the process proceeds to step S15 if not. In step S14, an update flag corresponding to the identification information set to the item of type of the selected policy record is set as "0" and the process proceeds to step S15. The update flag corresponding to the identification information indicates whether or not each security information corresponding to the identification information has been updated after the update date and time has passed, and it is set as "0" after the update date and time has passed and set as "1" if the security information is updated after the update date and time has passed.

In step S15, it is determined whether or not there is a policy record not selected to be processed. The process goes back to step S12 if there is a policy record not selected and the process proceeds to step S16 if not.

In step S16, it is determined whether or not an update instruction has been received from the administrative server 200. The process proceeds to step S17 if an update instruction has been received and the process goes back to step S12 if not. In step S17, a type of the security information is identified. The identification information included in the update instruction is identified as a type of security information. Then, the identified type and the security information included in the update instruction are temporarily stored (step S18), and the process proceeds to step S19.

In step S19, it is determined whether or not the update date and time has passed. The update date and time of the security information identified by the identification information included in the update instruction is acquired with reference to the policy table 291 acquired in step S11, and it is determined that the update date and time has passed if the current date and time is after the update date and time. It will be a waiting state until the update date and time has passed (NO in step S19), and the process proceeds to step S20 if the update date and time has passed.

In step S20, the security information is updated and the process proceeds to step S12. The password table 91 stored in the HDD 115 is updated with the security information temporarily stored in step S18. Specifically, a pair including the same identification information as the identification information temporarily stored in step S18 is identified from pairs of identification information and security information included in the password table 91 stored in the HDD 115, and the security information of the identified pair is updated with the security information temporarily stored together with the identification information in step S18. In step S21, the update flag corresponding to the identification information of the security information updated in step S20 is set as "1" and the process goes back to step S12.

Figure 9:
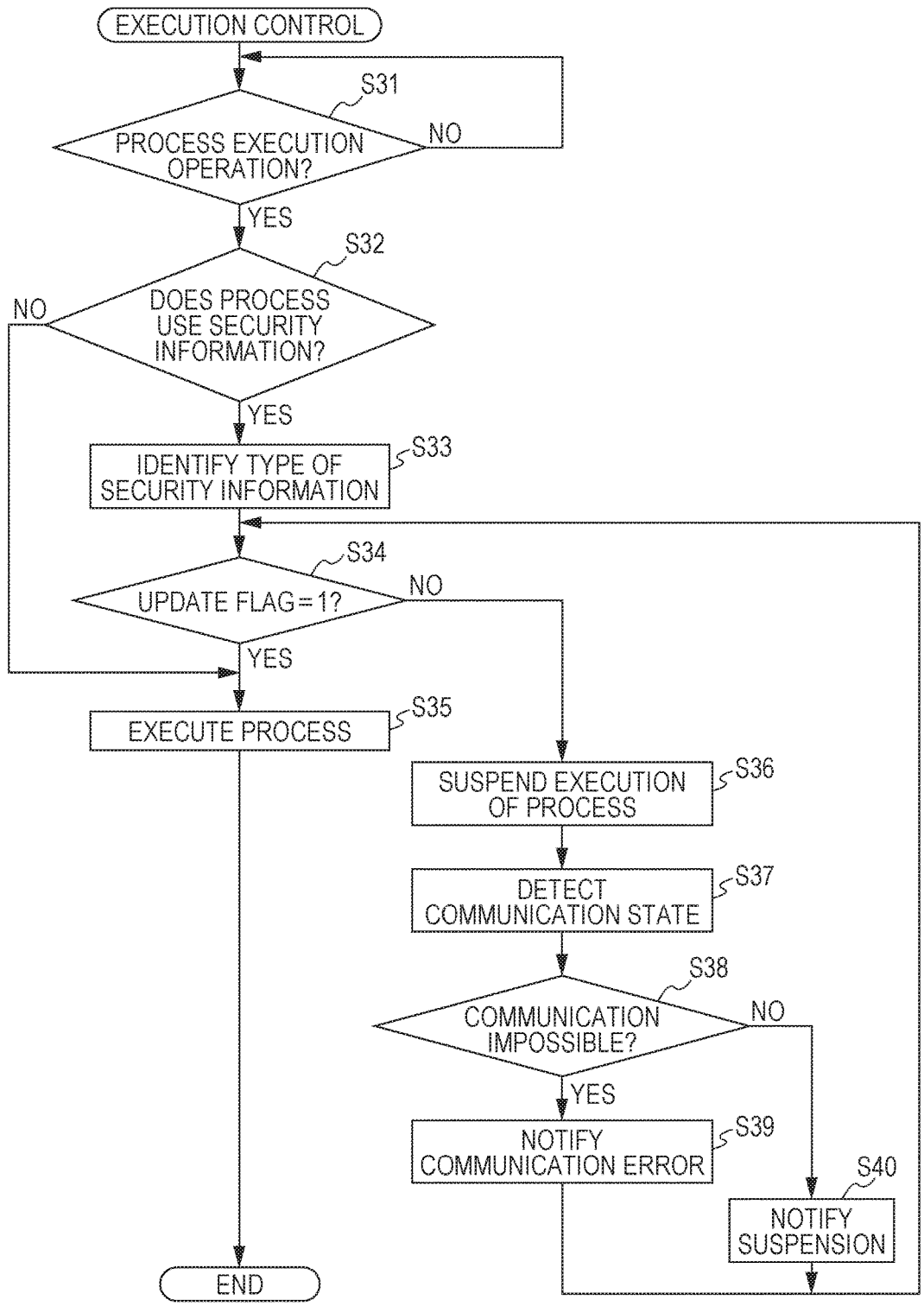
FIG. 9 is a flow chart showing an example of a flow of an execution control process.

FIG. 9 is a flow chart showing an example of a flow of an execution control process. The execution control process is a process executed by the CPU 111 by execution of an execution control program stored in the ROM 113, the HDD 115, or the CD-ROM 118 by the CPU 111 included in each of the MFPs 100 and 100A to 100D. The execution control program is a part of security information update program. With reference to FIG. 9, the CPU 111 included in the MFP 100 determines whether or not a process execution operation is accepted (step S31). The process execution operation is an operation to instruct execution of a process, and sometimes accepted as remote control from an external device when the user inputs via the operation unit 163 or when the MFP 100 is remotely controlled by the external device. It will be kept as a waiting state until a process execution operation is accepted, and the process goes to step S32 if a process execution operation is accepted.

In step S32, it is determined whether or not the process identified by the process execution operation is a process using security information. The process proceeds to step S33 if the process identified by the process execution operation is a process using security information, and the process proceeds to step S35 if not. In step S35, the process identified by the process execution operation is executed and the process is completed.

In step S33, a type of security information is identified. The policy table 291 acquired from the administrative server 200 is referred to and a type of the security information used for the process identified by the process execution operation is identified. For example, if the process identified by the process execution operation is a process of transmitting/receiving emails, the identification information "mail-account-A" is identified, and if the process identified by the process execution operation is a process of accessing database, the identification information "DB-account-B" is identified.

In the next step S34, it is determined whether or not the update flag corresponding to the identification information of a type identified in step S33 is set as "1." The process proceeds to step S35 if the update flag is set as "1" and the process proceeds to step S36 if not. In step S35, the process identified by the process execution operation accepted in step S31 is executed and the process is completed.

In step S36, the process identified by the process execution operation is suspended and the process proceeds to step S37. For example, a job corresponding to the process identified by the process execution operation is stored in the RAM 114. In step S37, a communication state is detected. If the process identified by the process execution operation is a process of transmitting/receiving emails, a communication state with the service providing server 300 serving as an email server is detected and if the process identified by the process execution operation is a process of accessing database, a communication state with the service providing server 300A serving as a DB server is detected. For example, a PIG command is executed for a device for which a communication state is detected, and it is determined that it can communicate if there is a response from the device, and it is determined that it cannot communicate if there is no response form the device.

In the next step S38, the process is separated depending on the communication state. The process proceeds to step S39 if the communication state shows that it cannot communicate, and the process proceeds to step S40 if not. In step S39, a communication error is notified and the process goes back to step S34. For example, a message indicating that it cannot communicate is displayed on the display unit 161. In step S35, that execution of the process is suspended is notified and the process goes back to step S34. A message indicating that the process cannot be executed because the security information has not been updated is displayed on the display unit 161.

As described above, in the security information update system 1 according to the present embodiment, for example, since each of the MFPs 100 and 100A to 100D prohibits execution of a process of receiving a service by the service providing server 300 until security information is updated by the security information updated at the update date and time in the service providing server 300, the security information before update is not transmitted to the service providing server 300 and it is possible to prevent occurrence of an event of authentication failure in the service providing server 300. Especially, it is effective when the identification information "mail-account-A" is used as the same account for the MFPs 100 and 100A to 100D to receive a service by the service providing server 300. For example, when a process of receiving a service by the service providing server 300 is executed without being prohibited while the security information is not updated by the security information updated at the update date and time in the service providing server 300 in one of the MFPs 100 and 100A to 100D, for example, the MFP 100, the identification information "mail-account-A" and the security information before update are transmitted to the service providing server 300. In this case, authentication in the service providing server 300 is not successful. Moreover, when authentication in the service providing server 300 is not successful for several consecutive times in the MFP 100, the service providing server 300 locks the identification information "mail-account-A," which is an account. When the identification information "mail-account-A," which is an account, is locked, authentication in the service providing server 300 is not successful even if the security information has been updated in other MFPs 100A to 100D. For example, since each of the MFPs 100 and 100A to 100D according to the present embodiment prohibits execution of a process of receiving a service by the service providing server 300 until the security information is updated by the security information updated at the update date and time in the service providing server 300, it is possible to prevent an occurrence of an event of locking of an account in the service providing server 300.

In addition, since each of the MFPs 100 and 100A to 100D executes a process that has been prohibited in accordance with update of the security information while execution of the process of receiving a service by the service providing server 300 is being prohibited, an operation to execute the process that has been prohibited again is not necessary.

In addition, since each of the MFPs 100 and 100A to 100D acquires security information after update after the update date and time determined by the security policy has passed, it is possible to update the security information immediately after the acquisition.

In addition, for example, since each of the MFPs 100 and 100A to 100D notifies the user that the security information has not been updated while execution of a process of receiving a service by the service providing server 300 is being prohibited, it is possible to notify the user of a reason for not executing a process of receiving a service by the service providing server 300.

In addition, for example, since each of the MFPs 100 and 100A to 100D notifies that it is not possible to communicate with the service providing server 300 if discommunication with the service providing server 300 is detected while execution of a process of receiving a service by the service providing server 300 is being prohibited, it is possible to notify the user that the reason for not executing a process of receiving a service by the service providing server 300 is a communication error.

In addition, since each of the MFPs 100 and 100A to 100D acquires the policy table 291 from the administrative server 200, it is only required to manage the policy table 291 by the administrative server 200, and it is possible to easily manage the update date and time of the security information.

In addition, for example, the administrative server 200 transmits an update instruction including identification information and new security information after being updated in the service providing server to each of the MFPs 100 and 100A to 100D at the date and time determined on the basis of the update date and time determined by the security policy for the identification information stored in the service providing server 300. Each of the MFPs 100 and 100A to 100D updates security information corresponding to the service providing server 300 identified by a type of the identification information included in the update instruction with the new security information included in the update instruction in accordance with reception of the update instruction from the administrative server 200. Therefore, it is possible to shorten a gap of a timing for updating the security information in each of the MFPs 100 and 100A to 100D.

In addition, since each of the MFPs 100 and 100A to 100D is classified into any of one or more groups and the identification information is group identification information for identifying any of one or more groups, the security information can be updated even if one type of security information is stored in not all the several information processing devices. For example, when the identification information "mail-account-A" stored in the service providing server is stored in the MFPs 100 and 100A but not stored in the MFPs 100B to 100D, the MFPs 100 and 100A are classified into the group of the group identification information "mail-account-A." Although the security information of a type identified by the group identification information "mail-account-A" is updated in the MFPs 100 and 100A classified into the group of the group identification information "mail-account-A," the security information of a type identified by the group identification information "mail-account-A" is not updated in the MFPs 100B to 100D.

<First Modification>

If the administrative server 200 acquires security information before the update date and time, an update instruction may be transmitted before the update date and time has passed.

For example, the update instruction unit 253 included in the CPU 201 that is included in the administrative server 200 may generate new security information. In this case, the update instruction unit 253 generates new security information corresponding to the security information registered in the service providing server 300, transmits an update instruction, and causes the service providing server 300 to update the security information registered in the service providing server 300 with the generated security information when the update date and time has come. In addition, the update instruction unit 253 generates new security information corresponding to the security information registered in the service providing server 300A, transmits an update instruction, and causes the service providing server 300A to update the security information registered in the service providing server 300A with the generated security information when the update date and time has come.

In the first modification, since each of the MFPs 100 and 100A to 100D acquires security information after update at the date and time before the update date and time determined by the security policy, security information can be updated at the update date and time.

<Second Modification>

In the security information update system 1 according to the embodiment described above, when the administrative server 200 refers to the policy table 291 and the update date and time set to the item of update date and time of the policy record has passed, an update instruction is transmitted to all devices set to the item of group device of the policy record. In the security information update system 1 according to the second modification, the administrative server 200 does not transmit an update instruction.

Figure 10:
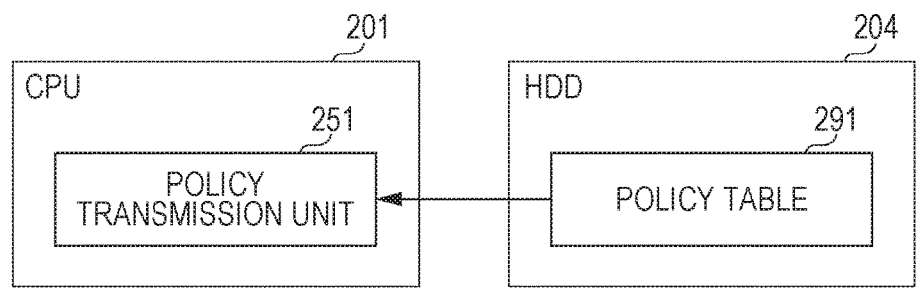
FIG. 10 is a block diagram illustrating an example of a function of a CPU included in an administrative server according to a second modification together with information stored in an HDD.

FIG. 10 is a block diagram illustrating an example of a function of a CPU included in an administrative server according to the second modification together with information stored in an HDD. The function illustrated in FIG. 10 is different from the function illustrated in FIG. 4 in that the update instruction unit 253 does not exist. Other functions are the same as the functions illustrated in FIG. 4 and repeated description will be omitted.

Figure 11:
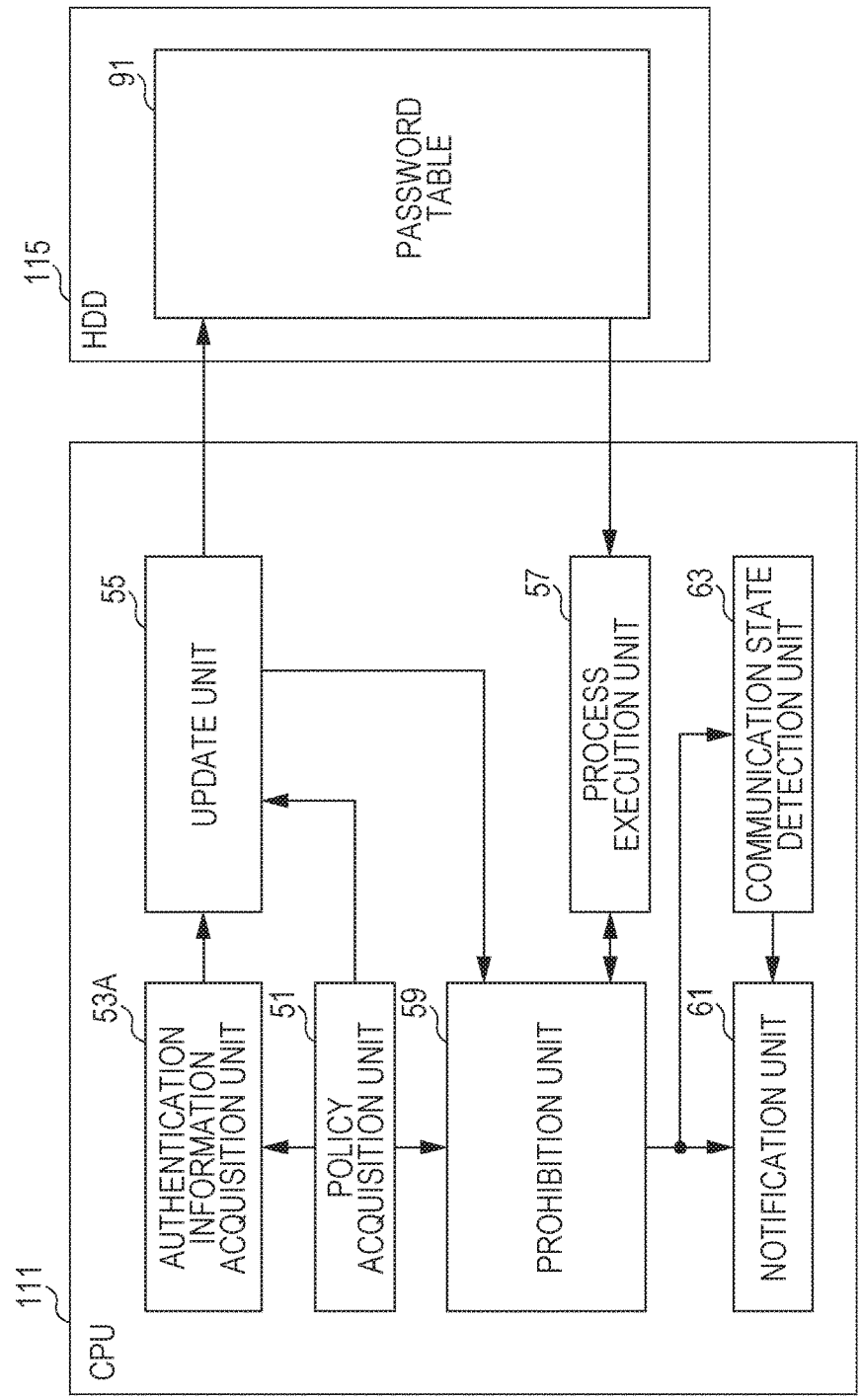
FIG. 11 is a block diagram illustrating an example of a function of a CPU included in an MFP according to the second modification together with information stored in an HDD.

FIG. 11 is a block diagram illustrating an example of a function of a CPU included in an MFP according to the second modification together with information stored in an HDD. The function illustrated in FIG. 11 is different from the function illustrated in FIG. 6 in that the update instruction receiving unit 53 is changed to an authentication information acquisition unit 53A. Other functions are the same as the functions illustrated in FIG. 6 and repeated description will be omitted.

The authentication information acquisition unit 53A refers to the policy table 291 input from the policy acquisition unit 51 to extract security information for which the update date and time has passed. Specifically, the authentication information acquisition unit 53A refers to the policy table input from the policy acquisition unit 51 to extract a policy record for which the current date and time has passed the update date and time, and new security information of a type identified by the identification information set to the item of type of the extracted policy record is acquired.

The authentication information acquisition unit 53A may acquire new security information corresponding to the identification information from the administrative server 200 or may acquire new security information from a device in which the security information of a type identified by the identification information, here, each of the service providing servers 300 and 300A. In addition, the authentication information acquisition unit 53A may acquire security information input by a user operating the MFP 100 to the operation unit 163.

In accordance with the acquisition of new security information, the authentication information acquisition unit 53A outputs a pair of the identification information and the acquired new security information to the update unit 55.

Figure 12:
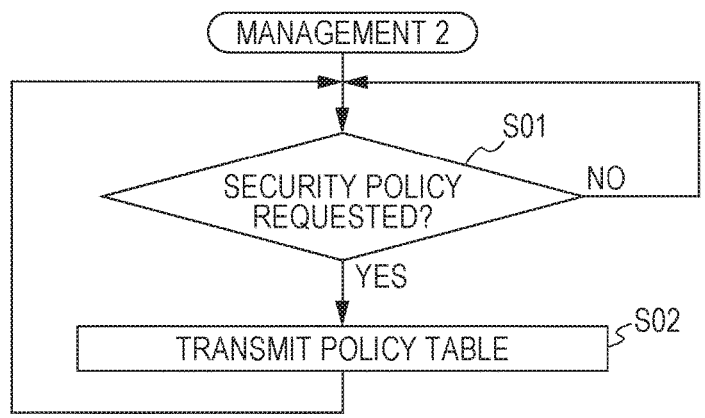
FIG. 12 is a flow chart showing an example of a flow of a management process according to the second modification.

FIG. 12 is a flow chart showing an example of a flow of a management process in the second modification. With reference to FIG. 12, the management process shown in FIG. 12 is different from the management process shown in FIG. 7 in that steps S03 to S08 are removed. Other processes are the same as the processes shown in FIG. 7 and repeated description will be omitted.

Figure 13:
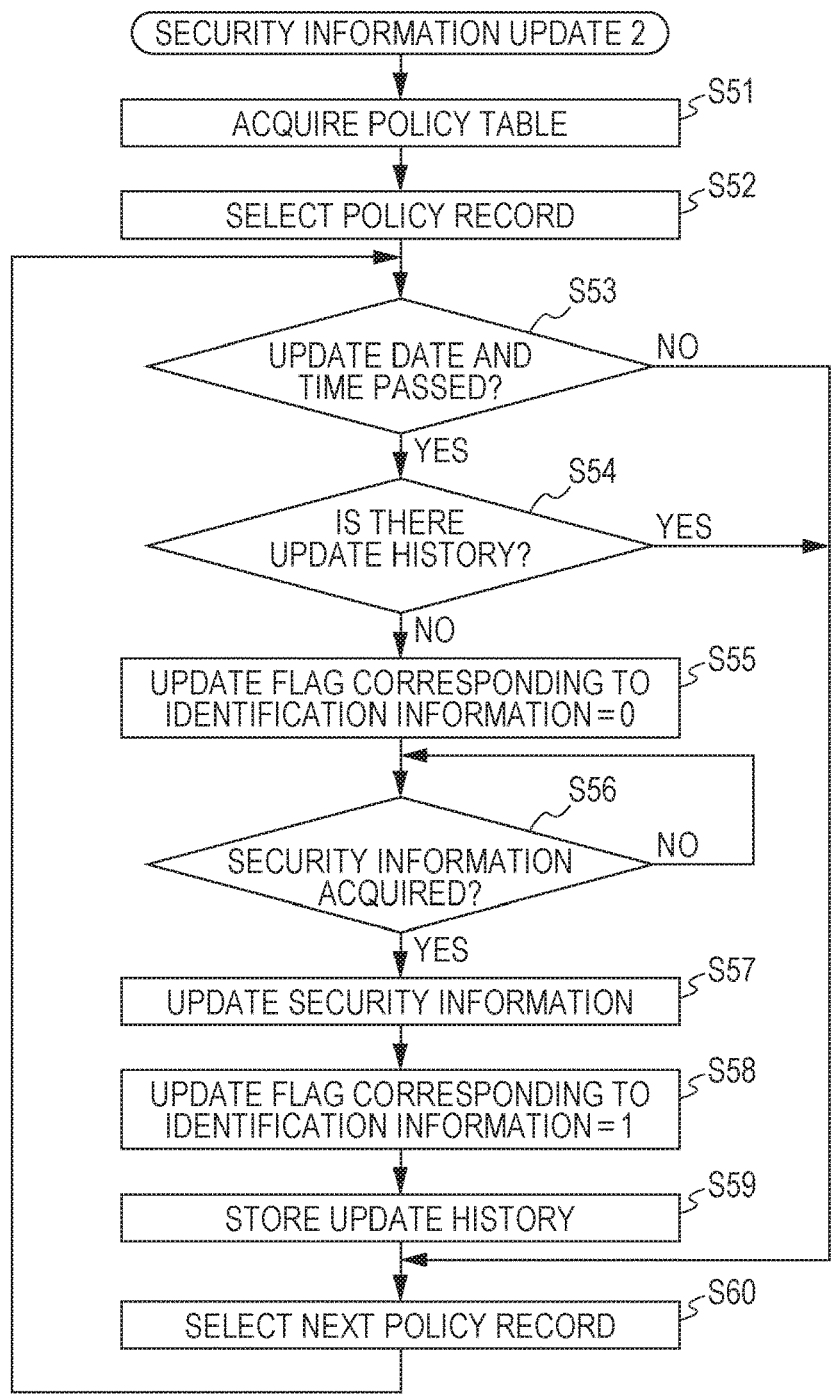
FIG. 13 is a flow chart showing an example of a flow of a security information update process according to the second modification.

FIG. 13 is a flow chart showing an example of a flow of a security information update process in the second modification. The security information update process in the second modification is a process executed by the CPU 111 by execution of a security information update program in the second modification stored in the ROM 113, the HDD 115, or the CD-ROM 118 by the CPU 111 included in each of the MFPs 100 and 100A to 100D. With reference to FIG. 13, steps S51 to S53 are the same as steps S11 to S13 in FIG. 8. That is, the CPU 111 included in the MFP 100 acquires a policy table from the administrative server 200 (step S51), selects a policy record to be processed from one or more policy records included in the policy table 291 (step S52) and determines whether or not the update date and time has passed (step S53). It is determined that the update date and time has passed and the process proceeds to step S54 if the current date and time is after the update date and time set to the item of update date and time of the policy record, and the process proceeds to step S60 if not.

In step S54, it is determined whether or not update history is stored. Update history is stored in step S59 described later and includes identification information of the security information and the date and time of update. It is determined that update history is stored if it is update history including the same identification information as the identification information set to the item of type of the policy record selected in step S52 and the date and time included in the update history is after the update date and time. The process proceeds to step S60 if update history is stored, and the process proceeds to step S55 if not.

In step S55, the update flag corresponding to the identification information set to the item of type of the policy record selected in step S52 is set as "0" and the process proceeds to step S56. In step S56, whether or not security information has been acquired is determined. Here, a case in which security information is acquired from a device in which security information is registered is described as an example. For example, if the identification information set to the item of type of the policy record selected in step S52 is "mail-account-A," since the device to register the security information of a type identified by that identification information is the service providing server 300, new security information after update in the service providing server 300 is acquired from the service providing server 300. In addition, if the identification information set to the item of type of the policy record selected in step S52 is "DB-account-B," since the device to register the security information of a type identified by that identification information is the service providing server 300A, new security information after update in the service providing server 300A is acquired from the service providing server 300A. It will be kept as a waiting state until security information is acquired (NO in step S56), and the process proceeds to step S57 if security information is acquired (YES in step S56).

In step S57, security information is updated and the process proceeds to step S58. The password table 91 stored in the HDD 115 is updated with the security information acquired in step S56. Specifically, a pair including the same identification information as the identification information set to the item of type of the policy record selected in step S52 is identified from pairs of identification information and security information included in the password table 91 stored in the HDD 115, and the security information of the identified pair is updated with the security information acquired in step S56. In step S58, the update flag corresponding to the identification information of the security information updated in step S58 is set as "1" and the process proceeds to step S59.

In step S59, update history is stored and the process proceeds to step S60. The update history stored here includes the identification information of the security information updated in step S58 and the date and time the security information has been updated. In step S60, the next policy record is set as a process object and the process goes back to step S53.

In the second modification, the CPU 111 included in the MFP 100 executes an execution control process shown in FIG. 9.

In the second modification, if the security information after update is acquired at the date and time after the update date and time determined by the security policy, each of the MFPs 100 and 100A to 100D can update the security information in accordance with acquisition of the security information, and if the security information after update is acquired at the date and time before the update date and time determined by the security policy, each of the MFPs 100 and 100A to 100D can update the security information at the update date and time.

In addition, since each of the MFPs 100 and 100A to 100D acquires the security information after update from the administrative server 200 if the administrative server 200 stores new security information after update, acquisition of the security information after update is easy.

In addition, in the MFPs 100 and 100A to 100D, when security information input to the operation unit 163 by the user is acquired as the security information after update, secrecy can be improved by not transmitting/receiving the security information.

<Third Modification>

In the second modification, each of the MFPs 100 and 100A to 100D functioning as an information processing device acquires security information on the basis of the policy table 291 acquired from the administrative server 200. The security information update system 1 of the third modification is different from the security information update system 1 of the second modification in that security information is updated in another device belonging to the same group as the device for which security information has been updated in accordance with occurrence of an event of acquiring security information in any of the MFPs 100 and 100A to 100D functioning as an information processing device.

Several devices belonging to groups are determined for types of security information by the policy table 291 stored in the administrative server 200. Note that, although several devices belonging to the same group are determined by the policy table 291 here, a device belonging to a group is not limited to the policy table 291. For example, each of the MFPs 100 and 100A to 100D functioning as an information processing device may store.

For example, security information of a type of the identification information "mail-account-A" is updated in each of the MFPs 100A to 100D belonging to the same group as the MFP 100 in accordance with occurrence of an event of updating security information of a type of the identification information "mail-account-A" in any of the MFPs 100 and 100A to 100D, for example, in the MFP 100. For example, the MFP 100 for which security information is acquired transmits the security information and the identification information "mail-account-A" indicating a type of the security information to other devices MFPs 100A to 100D belonging to the same group, and each of the MFPs 100A to 100D updates with the security information and the identification information "mail-account-A" received from the MFP 100. In addition, the MFP 100 for which the security information of a type of the identification information "mail-account-A" has been updated may transmit the security information and the identification information "mail-account-A" to the administrative server 200, and the administrative server 200 may transmit the security information and the identification information "mail-account-A" received from the MFP 100 to each of other devices MFPs 100A to 100D belonging to the same group as the MFP 100.

In the security information update system 1 of the third modification, each of the MFPs 100 and 100A to 100D is classified into a group identified by a type of the security information. For example, the MFPs 100 and 100A to 100D storing the security information of a type of the identification information "mail-account-A" are classified into the same group. Then, the security information is updated in each of the MFPs 100A to 100D belonging to the same group as the MFP 100 in accordance with occurrence of an event of updating the security information of a type of the identification information "mail-account-A" in any of the MFPs 100 and 100A to 100D belonging to the group corresponding to the identification information "mail-account-A," for example, in MFP 100. Therefore, it is only required to input security information in any of the MFPs 100 and 100A to 100D belonging to the same group, and an operation of a user for updating the security information can be simplified.

<Additional Statement>

(1) A service provided by the service providing server is a service for storing history of a process.

(2) A service provided by the service providing server is a service for transmitting/receiving emails.

Although the present invention has been described and illustrated in detail, it is clearly understood that the same is by way of illustrated and example only and is not to be taken by way of limitation, the scope of the present invention being interpreted by terms of the appended claims. The scope of the present invention is intended to include all modifications within the same meaning and range as those of equivalents of the appended claims.

What is claimed is:

1. A security information update system comprising:
   a service providing server;
   a plurality of information processing devices; and
   an administrative server,
   wherein:
   the service providing server comprises:
     an authentication information memory that stores a pair of identification information and security information, the security information being updated at an update date and time, and the identification information, and the identification information identifying a type of the security information, wherein the service providing server provides a service to one of the plurality of information processing devices when a pair of identification information and security information received from the one of the plurality of information processing devices is the same as the pair of identification information and security information stored in the authentication information memory, the administrative server comprises:
a policy memory; and
a first hardware processor that is configured to manage the security information stored in the service providing server, and each of the plurality of information processing devices comprises:
a security information memory that stores security information in association with identification information that is the same as the identification information stored in the service providing server; and
a second hardware processor that is configured to execute:
a policy acquisition process that acquires, from the administrative server, a security policy that is stored in the policy memory of the administrative server, wherein the security policy determines the identification information stored in the service providing server and an update date and time;
a process executing process that, when executing a process of receiving a service provided by the service providing server, transmits a pair of (i) identification information that is the same as the identification information stored in the service providing server and (ii) security information stored in association with the identification information, to the service providing server, and receives a service provided by the service providing server;
an authentication information acquisition process that acquires updated security information having been updated in the service providing server, the updated security information being associated with the identification information stored in the service providing server;
an update process that updates the security information stored in the security information memory in association with the identification information that is the same as the identification information stored in the service providing server, with the acquired updated security information, after the update date and time determined by the security policy for the identification information stored in the service providing server; and
a prohibition process that prohibits execution of the process of receiving a service provided by the service providing server after the update date and time determined by the security policy for the identification information stored in the service providing server, until the update process is successfully performed.

2. The security information update system according to claim 1, wherein the process executing process executes the process prohibited by the prohibition process in accordance with update of the security information stored in the security information memory by the update process after the update date and time has passed.

3. The security information update system according to claim 1, wherein the second hardware processor is further configured to execute a notification process that notifies a user that the security information has not been updated while execution of the process by the process executing process is being prohibited by the prohibition process.

4. The security information update system according to claim 1, wherein the second hardware processor is further configured to execute a communication state detection process that detects a communication state with the service providing server, and
wherein the notification process notifies that it is not possible to communicate with the service providing server if the communication state with the service providing server detected by the communication state detection process is a non-communicable state while execution of the process by the process executing process is being prohibited by the prohibition process.

5. The security information update system according to claim 1, wherein:
the first hardware processor is further configured to transmit an update instruction including the identification information and new security information after update in the service providing server to each of the plurality of information processing devices at a time and date determined based on the update date and time determined by the security policy for the identification information stored in the service providing server, and
the authentication information acquisition process acquires the new security information included in the update instruction as the updated security information in accordance with reception of the update instruction.

6. The security information update system according to claim 1, wherein the authentication information acquisition process acquires the updated security information after a date and time determined based on the update date and time determined by the security policy for the identification information stored in the service providing server.

7. The security information update system according to claim 6, wherein:
the administrative server stores new security information having been updated in the service providing server, the new security information being associated with the identification information stored in the service providing server, and
the authentication information acquisition process acquires, as the updated security information, the new security information from the administrative server.

8. The security information update system according to claim 6, wherein:
each of the plurality of information processing devices further comprises an input device that accepts an operation input by a user, and
the authentication information acquisition process acquires new security information accepted by the input device as the updated security information.

9. The security information update system according to claim 1, wherein:
each of the plurality of information processing devices is classified into one or more groups, and
the identification information comprises group identification information for identifying one or more groups.

10. An information processing device that can communicate with a service providing server and an administrative server, the service providing server providing a service when a pair of identification information and security information received from the information processing device is the same as a pair of identification information and security information stored in advance by the service providing server, and the information processing device comprising:
- a security information memory that stores security information in association with identification information that is the same as the identification information stored in the service providing server; and
- a hardware processor that is configured to execute:
  - a policy acquisition process that acquires, from the administrative server, a security policy that is stored in a policy memory of the administrative server, the security policy determining the identification information stored in the service providing server and an update date and time;
  - a process executing process that, when executing a process of receiving a service provided by the service providing server, transmits a pair of (i) identification information that is the same as the identification information stored in the service providing server and (ii) security information stored in association with the identification information, to the service providing server, and receives a service provided by the service providing server;
  - an authentication information acquisition process that acquires updated security information having been updated in the service providing server, the updated security information being associated with the identification information stored in the service providing server;
  - an update process that updates the security information stored in the security information memory in association with the identification information that is the same as the identification information stored in the service providing server, with the acquired updated security information, after the update date and time determined by the security policy for the identification information stored in the service providing server; and
  - a prohibition process that prohibits execution of the process of receiving a after service provided by the service providing server after the update date and time determined by the security policy for the identification information stored in the service providing server, until the update process is successfully performed.

11. A security policy update method executed in an information processing device that can communicate with a service providing server and an administrative server, the service providing server providing a service when a pair of identification information and security information received from the information processing device is the same as a pair of identification information and security information stored in advance by the service providing server, the information processing device comprising a security information memory that stores security information in association with identification information that is the same as the identification information stored in the service providing server, and the security policy update method comprising:
- acquiring, from the administrative server, a security policy that is stored in a policy memory of the administrative server, the security policy determining the identification information stored in the service providing server and an update date and time;
- when executing a process of receiving a service provided by the service providing server, transmitting a pair of (i) identification information that is the same as the identification information stored in the service providing server and (ii) security information stored in association with the identification information, to the service providing server, and receiving a service by the service providing server;
- acquiring updated security information having been updated in the service providing server, the updated security information being associated with the identification information stored in the service providing server;
- updating the security information stored in the security information memory in association with the identification information that is the same as the identification information stored in the service providing server, with the acquired updated security information, after the update date and time determined by the security policy for the identification information stored in the service providing server; and
- prohibiting execution of the process of receiving a service provided by the service providing server after the update date and time determined by the security policy for the identification information stored in the service providing server, until the updating the security information is successfully performed.

12. A non-transitory recording medium storing a computer readable security information update program executed in a computer for controlling an information processing device that can communicate with a service providing server and an administrative server, the service providing server providing a service when a pair of identification information and security information received from the information processing device is the same as a pair of identification information and security information stored in advance by the service providing server, the information processing device comprising a security information memory that stores security information in association with identification information that is the same as the identification information stored in the service providing server, and the security policy update program controlling the computer to execute processes comprising:
- acquiring, from the administrative server, a security policy that is stored in a policy memory of the administrative server, the security policy determining the identification information stored in the service providing server and an update date and time;
- when executing a process of receiving a service provided by the service providing server, transmitting a pair of (i) identification information that is the same as the identification information stored in the service providing server and (ii) security information stored in association with the identification information, to the service providing server, and receiving a service by the service providing server;
- acquiring updated security information having been updated in the service providing server, the updated security information being associated with the identification information stored in the service providing server;
- updating the security information stored in the security information memory in association with the identification information that is the same as the identification information stored in the service providing server, with the acquired updated security information, after the update date and time determined by the security policy for the identification information stored in the service providing server; and
- prohibiting execution of the process of receiving a service provided by the service providing server after the update date and time determined by the security policy for the identification information stored in the service providing server, until the updating the security information is successfully performed.

* * * * *